No. 752,693. PATENTED FEB. 23, 1904.
O. LÖFFLER.
FILTER.
APPLICATION FILED JUNE 9, 1903.
NO MODEL.
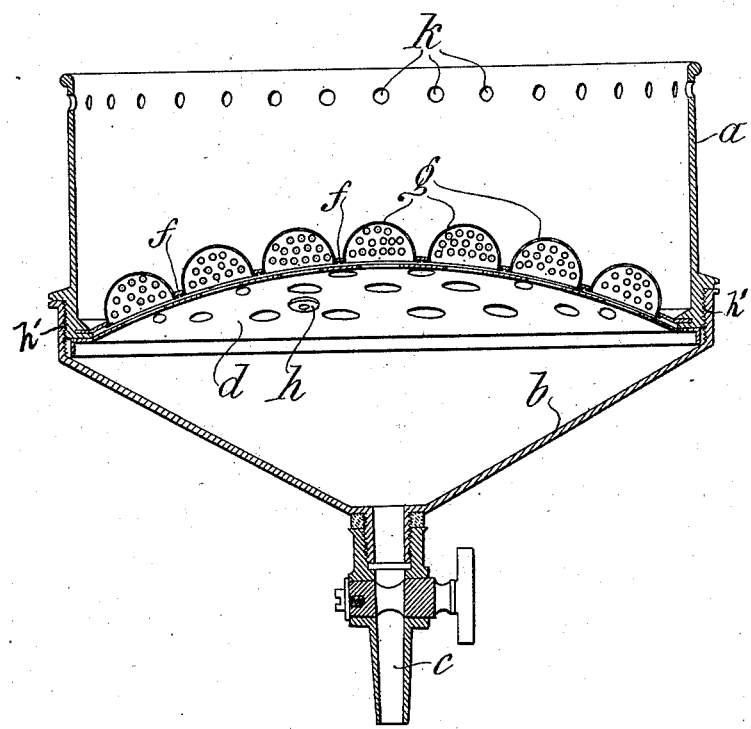
Witnesses:
Jos. J. Lewis
C. N. Schiery
Inventor:-
Oswald Löffler
by Paul P. Schilling
attorney No. 752,693. Patented February 23, 1904.

UNITED STATES PATENT OFFICE.

OSWALD LÖFFLER, OF VIENNA, AUSTRIA-HUNGARY.

FILTER.

SPECIFICATION forming part of Letters Patent No. 752,693, dated February 23, 1904.

Application filed June 9, 1903. Serial No. 160,749. (No model.)

*To all whom it may concern:*

Be it known that I, OSWALD LÖFFLER, a subject of the Emperor of Austria-Hungary, and a resident of Vienna, Austria-Hungary, have invented certain new and useful Improvements in Filters, of which the following is a specification.

The present invention has reference to improvements in filters, and relates more especially to improvements in that class of filters in which the filtering material is floated upon a carrying-surface and the filtrate enters the filter-casing through side openings; and the object of the invention is to obtain a relatively large filtering-surface within a comparatively small filter-casing upon which the filtering medium will evenly spread.

According to this invention the surface intended to carry the filtering material is vaulted or domed and is provided with a plurality of openings, over each of which a profusely-perforated hollow semisphere or cup is arranged. The filtering material floats evenly upon and about these semispheres, and a much larger filtering area is obtained than if the filtering-surface were plane.

In the accompanying drawing is shown a vertical sectional elevation of a filter according to the present invention.

The filter-casing, as shown by way of example, is cylindrical in shape and provided with a bottom $b$ and tap $c$. Within the casing is provided the vaulted intermediate bottom $d$ with a plurality of openings. Above this bottom $d$ is arranged the correspondingly-vaulted surface $f$, which carries the semispheres $g$. These latter may be retained in the surface $f$ by means of their flanged rim catching underneath the said surface or in any other suitable manner and are prevented from falling through by the underlying intermediate bottom $d$, which in turn is secured to the carrying-surface $f$ by means of screw-bolts $h$, threads $h'$, or the like. The filtrate enters the filter-casing through side openings $k$.

The described construction allows of readily disconnecting the various parts for repairing or cleaning purposes.

What I claim is—

1. A filter, comprising a casing with influx-openings, a bottom thereto, a tap in said bottom, an intermediate, vaulted and perforated bottom, a carrying-surface above said intermediate bottom, a plurality of perforated cups, and means for readily securing said cups between said carrying-surface and said intermediate bottom and disconnecting them again, substantially as and for the purpose set forth.

2. A filter comprising a casing with influx and efflux openings, a bottom, an intermediate perforated bottom, a carrying-surface above said bottom provided with openings, and a plurality of flanged perforated inverted cups passed upward into said openings and held by their flanges between the perforated bottom and carrying-surface, substantially as set forth.

In witness whereof I have hereunto set my hand in presence of two witnesses.

OSWALD LÖFFLER.

Witnesses:
MAX HAUSSER,
ALVESTO S. HOGUE.